(12) United States Patent
Metral

(10) Patent No.: US 11,120,430 B2
(45) Date of Patent: Sep. 14, 2021

(54) REPLAYING TOKENIZED PAYMENT TRANSACTIONS

(71) Applicant: PAYPAL INC., San Jose, CA (US)

(72) Inventor: Max Edward Metral, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 956 days.

(21) Appl. No.: 14/645,707

(22) Filed: Mar. 12, 2015

(65) Prior Publication Data

US 2016/0267480 A1 Sep. 15, 2016

(51) Int. Cl.
G06Q 20/36 (2012.01)
G06Q 20/32 (2012.01)

(52) U.S. Cl.
CPC ....... G06Q 20/367 (2013.01); G06Q 20/3226 (2013.01); G06Q 20/3278 (2013.01)

(58) Field of Classification Search
None
See application file for complete search history.

(56) References Cited

U.S. PATENT DOCUMENTS

| 2003/0055792 | A1* | 3/2003 | Kinoshita | G06Q 20/3674 705/67 |
| 2009/0070171 | A1* | 3/2009 | Patterson | G06Q 40/00 705/75 |
| 2012/0221468 | A1* | 8/2012 | Kumnick | G06Q 20/20 705/44 |
| 2012/0290376 | A1* | 11/2012 | Dryer | G06Q 20/425 705/14.23 |
| 2013/0191232 | A1 | 7/2013 | Calman et al. | |
| 2013/0238455 | A1* | 9/2013 | Laracey | G06Q 20/108 705/21 |

(Continued)

OTHER PUBLICATIONS

International Search Report and Written Opinion issued by the U.S. International Searching Authority for PCT/US2016/0031325 dated Aug. 5, 2016; 8 pp.

(Continued)

*Primary Examiner* — Neha Patel
*Assistant Examiner* — Gabriel Mercado
(74) *Attorney, Agent, or Firm* — Haynes and Boone, LLP

(57) ABSTRACT

Methods, systems, and computer program products for replaying tokenized payment transactions are disclosed. A computer-implemented method may include generating or receiving a token for a tokenized payment transaction involving a merchant, creating an association between the token and the tokenized payment transaction, storing the association between the token and the tokenized payment transaction, providing the token to the merchant during the tokenized payment transaction to authorize payment, receiving a request from the merchant to provide the token during a subsequent transaction relating to the tokenized payment transaction, selecting a transaction record corresponding to the tokenized payment transaction to retrieve the token for the second transaction, and determining the token to provide to the merchant in the second transaction. In some examples, a non-payment identifier previously generated by a merchant or a user device is associated with the tokenized payment transaction and provided to the merchant to complete the second transaction.

20 Claims, 5 Drawing Sheets

(56) References Cited

U.S. PATENT DOCUMENTS

| | | | |
|---|---|---|---|
| 2013/0262281 A1* | 10/2013 | Puchek | G06Q 30/016 |
| | | | 705/35 |
| 2014/0025958 A1 | 1/2014 | Calman | |
| 2014/0074637 A1 | 3/2014 | Hammad | |
| 2014/0108260 A1 | 4/2014 | Poole et al. | |
| 2015/0032627 A1* | 1/2015 | Dill | H04L 9/32 |
| | | | 705/44 |
| 2015/0046338 A1 | 2/2015 | Laxminarayanan et al. | |
| 2015/0058145 A1 | 2/2015 | Luciani | |
| 2015/0170146 A1* | 6/2015 | Ji | G06Q 20/3229 |
| | | | 705/44 |
| 2016/0012413 A1* | 1/2016 | Chitilian | G06Q 20/4014 |
| | | | 705/44 |
| 2017/0064554 A1* | 3/2017 | Li | H04L 9/32 |

OTHER PUBLICATIONS

International Searching Authority, International Search Report and Written Opinion for PCT/US2015/063452, dated Feb. 1, 2016, 9 pages.

EMV Payment Tokenisation Specification, Technical Framework, Version 1.0, Mar. 2014, 84 pages, http://www.emvco.com/specifications.aspx.

* cited by examiner

REPLAYING TOKENIZED PAYMENT TRANSACTIONS

TECHNICAL FIELD

The present disclosure generally relates to computer systems and, more particularly, to the replaying of tokenized payment transactions using computer systems.

BACKGROUND

Consumers may use credit cards, debit cards, bank cards, and other forms of payment to purchase various goods and services. Card numbers usually remain the same for some time, such as during a period when a card remains active. Thus, a cardholder may reuse the same card number when paying for various different purchases over a number of years. Also, a cardholder may present the same card number used to make a purchase later when requesting a refund since a card number generally does not change frequently.

Contactless payment systems generally offer consumers the added convenience of mobile payments and improved security features. For example, unlike card accounts, a contactless payment system may not use the same account identifier for different transactions. Instead, a contactless payment system may generate a new account identifier for each transaction. Other scenarios where account identifiers may change across transactions include when a consumer uses a different underlying card account or when a card account expires and a new account identifier is issued.

However, the added security of contactless payment systems can create challenges for consumers. For example, a consumer may not be able to return items purchased using a contactless payment system using the same method because different account identifiers are generated for the purchase and the return. As such, merchants generally do not have a way to accommodate users seeking to use a contactless payment system for follow-on and other types of non-routine transactions. Therefore, new and improved ways of replaying contactless payment transactions are of benefit to consumers and merchants.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Systems, methods, and computer program products are disclosed for replaying tokenized payment transactions. In an example, a mobile payment system replays a tokenized payment transaction to allow a user who made a purchase using a contactless payment system to perform exchanges, refunds, and/or other related transactions using contactless payment system technology.

In an example, a mobile payment system associated with an operating system or application running on a mobile computing device generates a token to use in a tokenized payment transaction (e.g., to authorize payment for the purchase of goods or services). The mobile payment system then creates an association between the token and a tokenized payment. The mobile payment system also may store the association, the token, and/or details of the tokenized payment transaction for future reference.

In an example, the mobile payment system provides the token to a merchant during a first tokenized payment transaction (e.g., a purchase). The mobile payment system then later receives a request from the merchant to provide the token as part of a second transaction (e.g., a return) related to the first tokenized payment transaction.

In an example, a user selects a transaction record in a digital wallet or mobile payment application corresponding to the tokenized payment transaction to retrieve the token for the second transaction, and the user provides the token to the merchant as part of a second transaction. For example, the user may provide the token to a merchant using a contactless payment system to complete a product refund or exchange using the contactless payment system.

In some examples, the mobile payment system generates and associates a non-payment identifier with a tokenized payment transaction. The mobile payment system may provide the associated non-payment identifier to a merchant. The merchant then may store and reference the non-payment identifier to locate information about the tokenized payment transaction at another time.

In some examples, a merchant generates a non-payment identifier and provides the non-payment identifier to the mobile payment system. The mobile payment system then may associate the non-payment identifier with a tokenized payment transaction and store the information for future transactions and reference.

Accordingly, aspects of the present disclosure provide users with the convenience and security of using contactless and tokenized payment systems for both purchases and other types of related transactions, including relatively common transactions such as exchanges and refunds.

Figure 1:
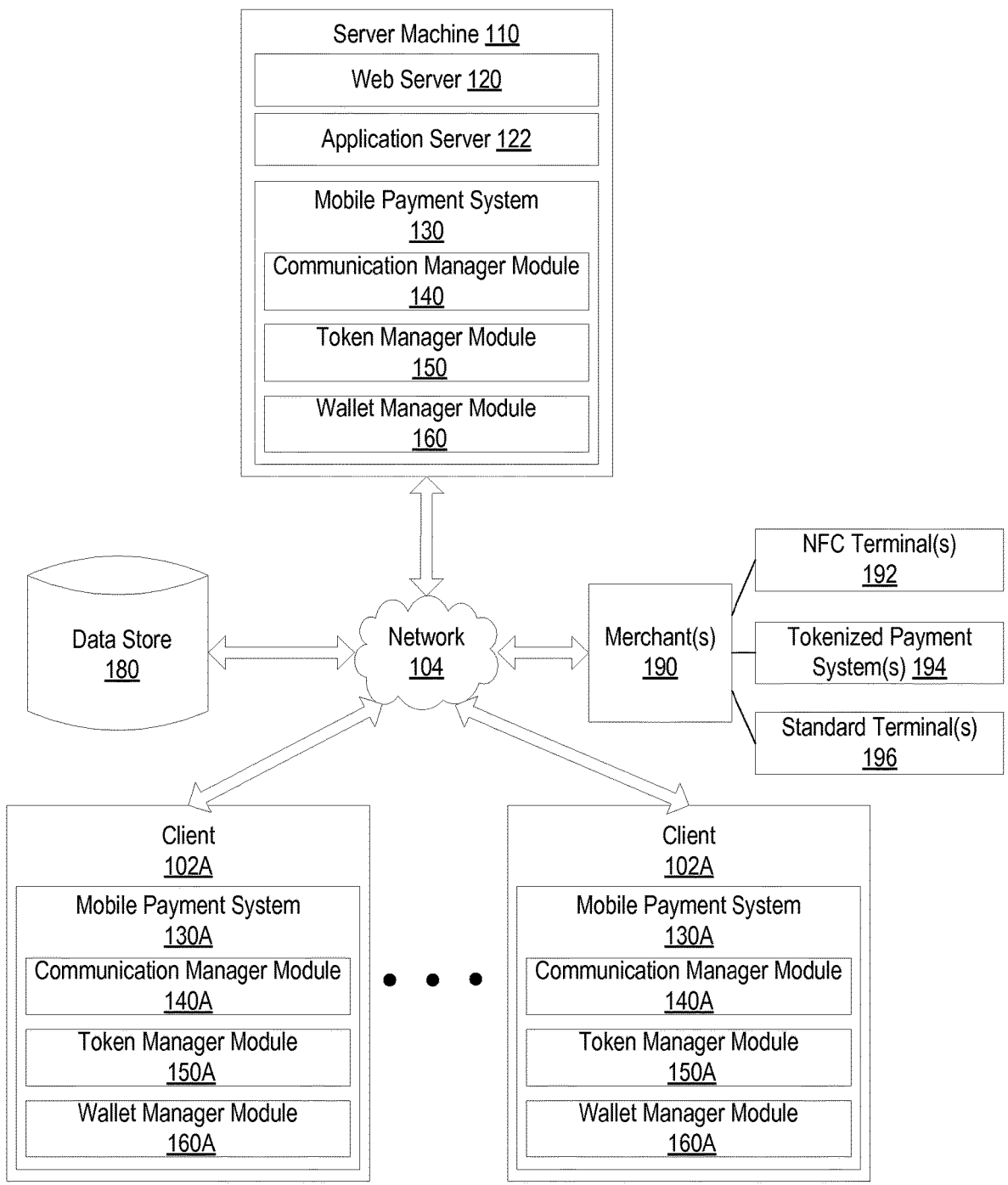
FIG. 1 is a block diagram illustrating a system architecture, in accordance with various examples of the present disclosure.

FIG. 1 illustrates an exemplary system architecture 100 in which examples of the present disclosure may be implemented. System architecture 100 includes one or more server machines 110, one or more data stores 180, one or more client machines 102A-102N, and one or more merchants 190 connected via one or more networks 104.

Network 104 may be a public network (e.g., the Internet), a private network (e.g., local area network (LAN) or wide area network (WAN)), or any combination thereof. In an example, network 104 may include the Internet, one or more intranets, wired networks, wireless networks, and/or other appropriate types of communication networks. In one example, network 104 may comprise a wireless telecommunications network (e.g., cellular phone network) adapted to communicate with other communication networks, such as the Internet. Network 104 also may include one or more short-range wireless networks or beacon networks.

Data store 180 generally refers to persistent storage capable of storing various types of data, such as text, audio, video, and image content. In some examples, data store 180 may include a network-attached file server, while in other examples data store 180 may include other forms of persistent storage such as an object-oriented database, a relational database, and so forth.

Client machine 102A may be a personal computer (PC), laptop, mobile phone, tablet computer, server computer, wearable computing device, or any other type of computing device. Client machine 102A may run an operating system (OS) that manages hardware and software of the client machine 102A. A browser (not shown) may run on the client machines (e.g., on the OS of the client machines). The browser may be a web browser that can access content and services provided by web server 120, application server 122, or a combination of a web server 120 and an application server 122. Other types of computer programs and computer scripts also may run on client machine 102A.

Client machines 102A-102N each may include a respective mobile payment system 130A-130N that allows a user to participate in mobile financial transactions using a portable computing device. Generally, a mobile payment system 130A may allow a user to make a contactless payment by sending a payment token as payment authorization to a near field communication (NFC) terminal 192 from a client machine 102A. Such contactless payments may be made by a user, for example, to pay for a purchase of goods or services, to make a donation, to make a deposit, to transfer funds, or for various other purposes. Further, such transactions may occur, for example, using NFC-enabled vending machines, NFC-enabled kiosks, NFC-enabled point-of-sale systems, and other various types of NFC-enabled computer systems.

Server machine 110 and mobile payment systems 130A-130N each include a respective communication manager module 140-140N, token manager module 150-150N, and wallet manager module 160-160N. In various examples, such modules may be combined, divided, and organized in various arrangements on one or more computing devices.

Merchants 190 generally refer to one or more parties that sell or otherwise provide products or services to various parties such as consumers, businesses, governments, non-profit organizations, etc. Merchants 190 generally may provide goods or services by having a physical presence, by operating online with a virtual presence, and/or with the assistance of one or more intermediate agents (e.g., brokers, handlers, shippers, etc.).

In an example, merchants 190 may accept and process payments for goods and services using one or more types of terminals and systems such as near field communication (NFC) terminals 192, tokenized payment systems 194, standard terminals 196, etc. A NFC terminal 192 generally describes a contactless payment system that allows a user to make secure payments using short-range, wireless, and/or radio frequency identification (RFID) technology by exchanging small amounts of data with an in-range computing device of the user. For example, a user may communicate payment information to a NFC terminal 192 wirelessly by tapping or holding a computing device (e.g., a smartphone, a wearable computing device, etc.) near a NFC terminal 192 to pay for a purchase. Such NFC terminals 192 may process tokenized payment transactions.

In an example, a user may add one or more sources or methods of payment (e.g., a credit card, debit card, a bank account, etc.) to a payment application running on a computing device (e.g., smart phone, smart watch, etc.). However, instead of storing actual card or account identifiers on the computing device, a unique device account number may be generated, encrypted, and stored securely in a secured element of the computing device. Next, a unique, single-use payment token to authorize a payment may be generated by the computing device, the payment application, a third-party such as a payment processor, or another party for each payment transaction in which the user participates.

In an example, a user may provide a unique, single-use payment token generated for specific payment transaction to a NFC terminal 192 via a NFC-enabled computing device to pay for a purchase. The merchant then may use the unique, single-use payment token alone or along with other payment information (e.g., a secure device-specific identifier, a secure surrogate account identifier, etc.) provided by the user's computing device to obtain payment from a payment processor, bank, or other financial institution. The use of a unique, single-use payment token in tokenized payment transactions is generally more secure than a reusable credit card or account number because the payment token is valid for a single transaction and cannot be reused by criminals to procure additional financial transactions.

Tokenization generally describes the process of substituting a sensitive data element with a non-sensitive equivalent (i.e., a token), which has no extrinsic or exploitable meaning or value. Such tokenized data may be mapped or translated back to the original data using secure methods. Thus, a single-use payment token may be mapped or translated to an actual payment account to apply a form of payment, but the single-use payment token has no meaning otherwise when used by itself.

A tokenized payment system 194 generally refers to any payment system other than a NFC terminal 192. For example, a user may participate in a tokenized payment transaction that does not involve a NFC terminal 192. For example, a merchant 190 may allow users to complete tokenized payment transactions online over a network 104 or using technology other than NFC.

A standard terminal 196 generally describes a point-of-sale system that does not support contactless or tokenized payment transactions. For example, some standard terminals 196 of merchants 190 may be limited to processing cash and/or credit card transactions.

Server machine 110 may include one or more web servers 120 and application servers 122. Web server 120 may provide text, audio, image, and video content from server machine 110 or other sources (e.g., data store 180) to client machines 102A-102N. Web server 120 also may provide web-based application services, business logic, and updates to client machines 102A-102N. Client machines 102A-102N may locate, access, and consume various forms of content and services from web server 120 using applications, such as a web browser, web servers, and various other types of computer applications, etc. Web server 120 also may receive text, audio, video, and image content from client machines 102A-102N, which may be stored in data store 180 for preservation and/or sharing of content.

In an example, a web server 120 is coupled to one or more application servers 122 that provide application services, data, business logic, and/or APIs to client machines 102A-102N. In some examples, such application servers 122 also may provide such services to client machines 102A-102N without use of a web server 120.

In an example, web server 120 may provide client machines 102A-102N with access to one or more application server 122 services associated with a mobile payment system 130. Such functionality also may be provided as part of one or more different web applications, standalone applications, systems, plug-ins, web browser extensions, and application programming interfaces (APIs), etc. In some examples, plug-ins and extensions generally may be referred to, individually or collectively, as "add-ons."

In an example, client machines 102A-102N may include an application associated with a service provided by server machine 110 (e.g., mobile payment system 130). For example, various types of computing devices (e.g., smart phones, smart televisions, tablet computers, smart wearable devices, smart home computer systems, etc.) may use applications to access services provided by server machine 110, to issue commands to server machine 110, and/or to receive content from server machine 110 without visiting or using web pages.

In an example, functions performed by server machine 110 also may be performed by client machines 102A-102N, in whole or in part. In addition, the functionality attributed to a particular component may be performed by different or multiple components operating together. Further, server machine 110 may be accessed as a service provided by systems or devices via appropriate application programming interfaces (APIs), and thus is not limited to use with websites.

For example, client machines 102A-102N each may include respective mobile payment systems 130A-130N and/or one or more client modules of a respective mobile payment system 130A-130N for providing mobile payment services to a user. Further, server machine 110 may include a respective mobile payment system 130 and/or one or more server-based modules of a mobile payment system 130.

In an example, communication manager module 140 of mobile payment system 130 generally performs communication related tasks associated with tokenized payment transactions. For example, a communication manager module 140 may receive requests and provide responses that are both internal and external to mobile payment system 130.

In some examples, communication manager module 140 receives payment tokens and non-payment tokens generated external to mobile payment system 130. Communication manager module 140 also may receive requests from a merchant 190 NFC terminal 192 or tokenized payment system 194 to provide a payment token authorizing payment in a tokenized payment transaction. Communication manager module 140 then may later receive a request to provide the payment token that was used or a different non-payment identifier of the tokenized payment transaction in a subsequent, related transaction. For example, a merchant 190 may request the payment token used in a first tokenized payment transaction to recall or retrieve the details of an initial contactless transaction for further processing, such as when a user wishes to return or exchange an item originally purchased using a NFC terminal 192.

In an example, token manager module 150 of mobile payment system 130 generates tokens for tokenized payment transactions. For example, token manager module 150 may generate unique, single-use payment tokens to be used as a form of payment in a tokenized payment transaction. Token manager module 150 also may generate various types of non-payment tokens, such as a device token, a payment method token (e.g., a secure card token), a security token, a secondary or surrogate non-payment token used to allow merchant 190 or a user to later reference a tokenized payment transaction, etc.

In an example, token manager module 150 creates an association between a token and a tokenized payment transaction. For example, token manager module 150 may associate a token and a tokenized payment transaction so that when a user selects or retrieves a corresponding transaction record, the user can provide the associated token to a merchant 190 for a related transaction. In one example, an association created between a token and a transaction record for a tokenized payment transaction allows a user to provide a merchant 190 with a token used in an initial purchase for a refund, product exchange, price match, later discovered discount, or other subsequent transaction relating to the initial purchase. In some examples, token manager module 150 may store a token with transaction data from a tokenized payment transaction, for example, locally on a client machine 102A or remotely in another data store 180 (e.g., cloud storage).

In an example, wallet manager module 160 of a mobile payment system 130 provides tokens to NFC terminals 192 and tokenized payment systems 194 of merchants 190. Wallet manager module 160 also may exchange other various tokenized payment transaction data with NFC terminals 192 and tokenized payment systems 194.

In an example, wallet manager module 160 provides a token to a merchant 190 as a form of payment in a first tokenized payment transaction. In a subsequent transaction associated with the first tokenized payment transaction (e.g., a return, exchange, price match, later discovered discount, etc.), a user may browse or search for the first transaction among one or more digital wallet receipts using a digital wallet application. The user then may select a digital wallet receipt associated with the first transaction to retrieve the associated token used in the first transaction. The user then may tap, wave or hold their computing device near a NFC terminal reader 192 to provide the original token to the merchant 190 in relation to the subsequent, related transaction.

In an example, wallet manager module 160 may provide a non-payment identifier associated with a first tokenized payment transaction to a NFC terminal 192 or tokenized payment system 194 to allow the merchant 190 to retrieve details of the first transaction. Wallet manager module 160 also may retrieve a non-payment identifier associated with the first tokenized payment transaction to allow a user to provide the non-payment identifier to the merchant 190 during a subsequent, related transaction using a NFC terminal 192, tokenized payment system 194, or standard terminal 196. In one example, wallet manager module 160 may display a non-payment identifier (e.g., a unique numeric string, alphanumeric string, bar code, QR code, etc.) that a user can provide at a standard terminal 196 to return a product, exchange a product, obtain a price match, and/or obtain a later discovered discount associated with a previous tokenized payment transaction.

In an example, wallet manager module 160 generates and associates a non-payment identifier with a tokenized payment transaction. Wallet manager module 160 then may provide the non-payment identifier associated with the tokenized payment transaction to a merchant 190. The merchant 190 may store the non-payment identifier received from the user for the tokenized payment transaction and later use the non-payment identifier at a later time to retrieve details about the initial transaction (e.g., when a user presents the non-payment identifier during a subsequent, related transaction).

Similarly, a merchant 190 may generate a non-payment identifier associated with the tokenized payment transaction and provide the non-payment identifier to wallet manager module 160, for example, via a NFC terminal 192. Wallet manager module 160 then may associate the non-payment identifier with the tokenized payment transaction and store the information for later reference. For example, wallet manager module 160 may store the non-payment identifier and transaction details locally on a client machine 102A. In some examples, wallet manager module 160 stores the non-payment identifier in an accessible data store 180 to allow such information to be retrieved and provided to a merchant using one or more different computing devices. Wallet manager module 160 then may provide the non-payment identifier to the merchant 190 at another time to retrieve original transaction details and perform activities relating to the earlier transaction.

In some examples, a user may provide a payment token and/or a non-payment identifier associated with a tokenized payment transaction to one or more other users. For example, a user may provide a payment token or a non-payment identifier for a tokenized payment transaction to allow a second user to perform a subsequent transaction relating to the tokenized payment transaction. In one example, a user provides a payment token or non-payment identifier of a transaction to another user in relation to a gift to allow the other user to exchange or receive a refund for the gift. Also, an employer may provide such information to an employee or contractor to allow that individual to obtain a refund or exchange for a tokenized payment transaction on behalf of the employer.

Figure 2:
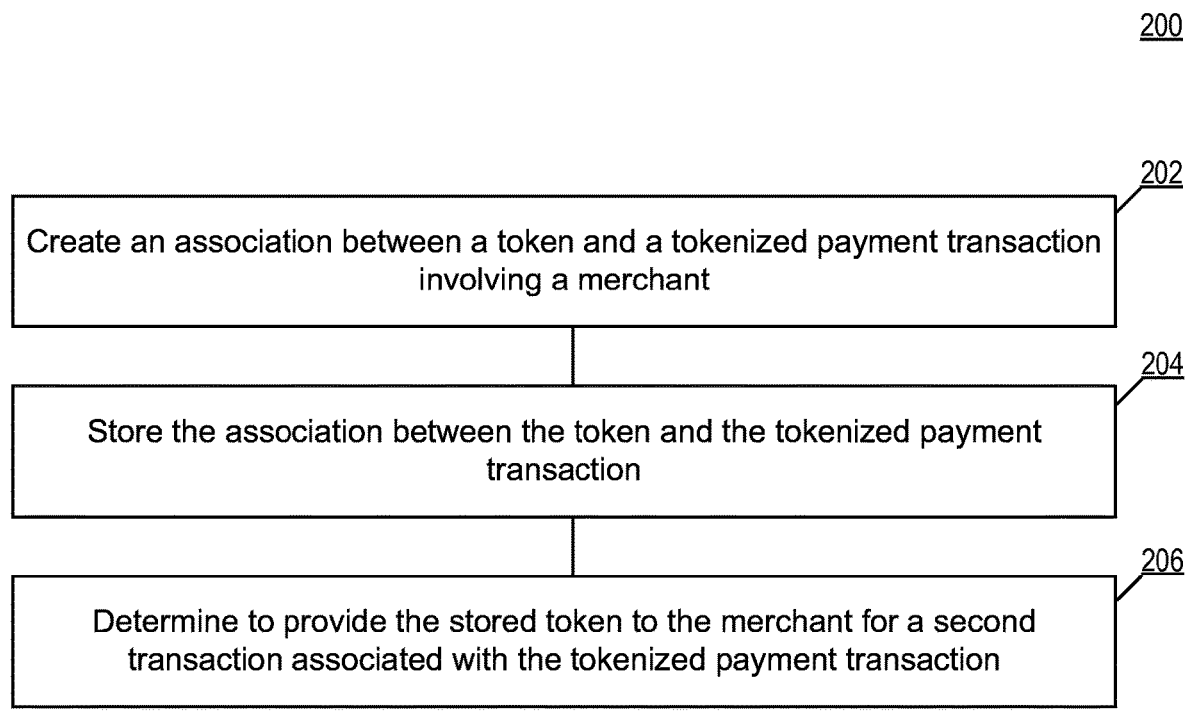
FIG. 2 is a flow diagram for providing replay of tokenized payment transactions, according to an example of the present disclosure.

FIG. 2 is a flow diagram for providing replay of tokenized payment transactions, according to an example of the present disclosure. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof. Examples in the method 200 are described with respect to mobile payment system 130A for the sake of consistency. Such examples also generally apply to other mobile payment system 130, 130N examples described herein.

Method 200 begins at block 202 when token manager module 150A of mobile payment system 130A creates an association between a token and a tokenized payment transaction involving a merchant. In an example, token manager module 150A associates a payment token with a tokenized payment transaction using one or more identifiers. For example, token manager module 150A may create one or more new identifiers or use one or more existing tokenized payment transaction details as identifiers to link a payment token with a corresponding transaction. Further, token manager module 150A also may store a copy of the payment token with an associated tokenized payment transaction record or receipt.

At block 204, token manager module 150A of mobile payment system 130A stores the association between the token and the tokenized payment transaction. In an example, token manager module 150A stores a payment token and corresponding tokenized payment transaction data to allow retrieval of such information at another time. For example, token manager module 150A may store a payment token and a corresponding tokenized payment transaction locally on a client machine 102A or in a data store 180 accessible to one or more other client machines. Storing tokens such as unique, single-use tokens from tokenized payment transactions creates an opportunity to allow users to perform future associated contactless transactions, such as returns and exchanges, without modifying NFC terminal 192 behavior.

At block 206, wallet manager 160A of mobile payment system 130A determines to provide the stored token to the merchant for a second transaction associated with the tokenized payment transaction. In an example, wallet manager module 160A determines that a payment token previously used for payment in a tokenized payment transaction (e.g., a contactless mobile payment purchase) is to be provided to a merchant 190 in a subsequent, related transaction (e.g., a contactless mobile payment return).

For example, a user may wish to return or exchange an item initially purchased using a tokenized payment transaction where a NFC-enabled client machine 102A provided a unique, single-use payment token to a NFC terminal 192 of a merchant 190 to authorize payment. To reference the first tokenized payment transaction, wallet manager 160A determines a payment token to retrieve by examining transaction details selected by a user. Wallet manager 160A then retrieves a payment token (e.g., an inactive, used, or expired payment token) associated with the selected original transaction and provides that payment token to the merchant 190 via a NFC terminal 192. The merchant uses the payment token to lookup the initial transaction to allow the user to return a product, exchange product, receive a price match discount, receive another type of discount, receive a later-discovered promotion, or perform another activity.

Figure 3:
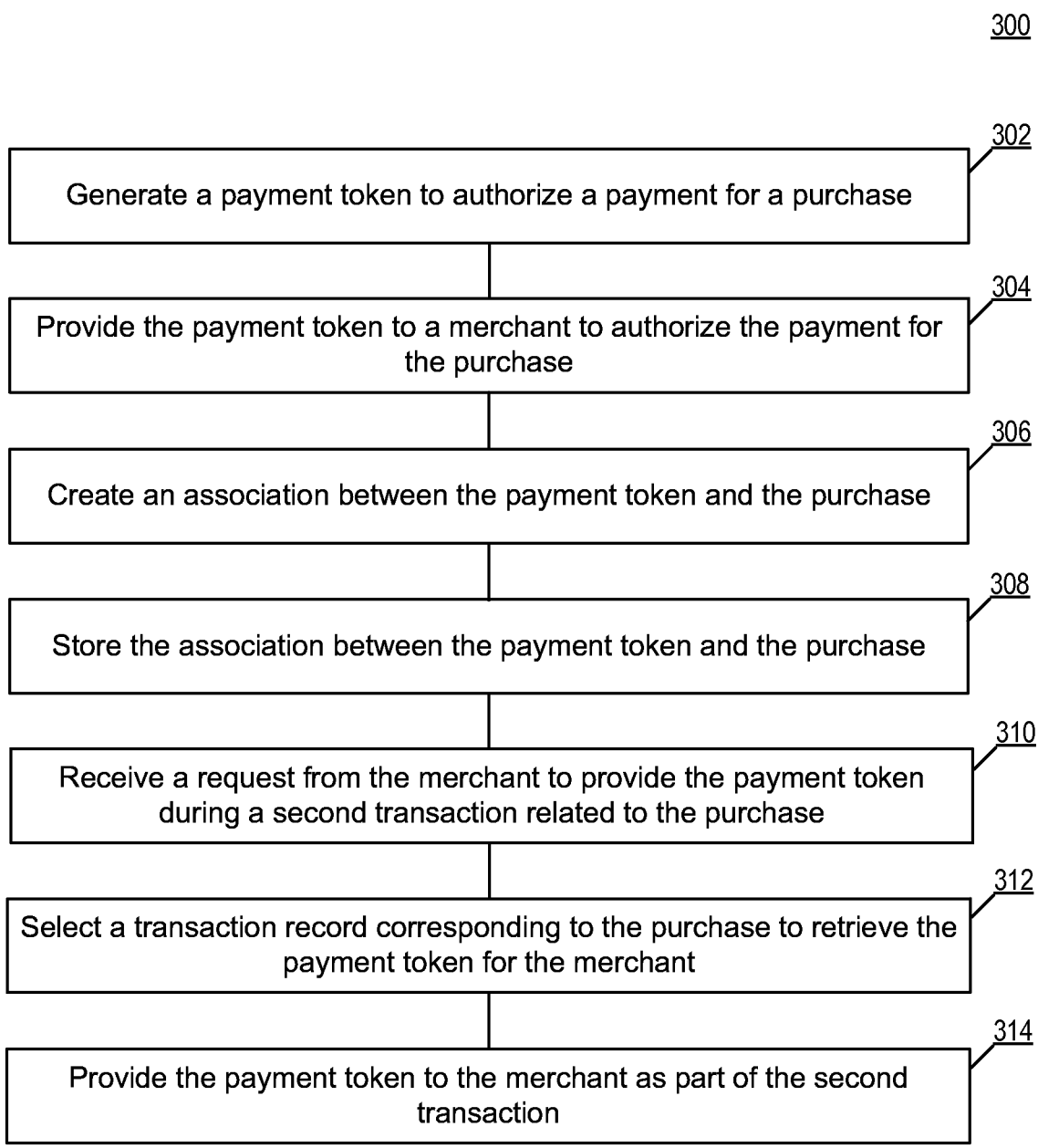
FIG. 3 is a flow diagram for providing replay of tokenized payment transactions using an application, according to an example of the present disclosure.

FIG. 3 is a flow diagram for providing replay of tokenized payment transactions using an application, according to an example of the present disclosure. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof. Examples in the method 300 are described with respect to mobile payment system 130A for the sake of consistency. Such examples also generally apply to other mobile payment system 130, 130N examples described herein.

Method 300 begins at block 302 when token manager module 150A of payment system 130A generates a payment token to authorize payment of a purchase. In an example, token manager module 150A generates a payment token that allows a user to authorize a payment for the tokenized payment transaction using a NFC terminal 192 or tokenized payment system 194. For example, token manager module 150A may generate a unique, single-use payment token by using a set of random numeric or alphanumeric values. Token manager module 150A also may generate unique, single-use payment tokens other ways, for example, using one or more various factors such as a unique generated device token stored on a secured element of the computing device, a unique generated payment method identifier stored on a secured element of the computing device, date information, time information, location information, or a combination of one or more of these and/or other various factors.

At block 304, wallet manager module 160A of payment system 130A provides the payment token to a merchant 190 to authorize the payment for the purchase. In an example, a client machine 102A detects a NFC terminal 192 that is prepared to receive a payment token authorizing payment of a pending purchase. A user then may provide a generated payment token to the merchant by tapping client machine 102A on NFC terminal 192, waving client machine 102A near NFC terminal 192, entering an authorization code on client machine 102A, supplying biometric authentication information to client machine 102A, etc. Once a client machine 102A provides a payment token to authorize payment of pending purchase then remaining steps of the transaction may be completed. The merchant 190 uses the payment token to obtain a payment from the payment processor, bank, or other financial institution. The merchant 190 also may store the payment token used for a purchase for later reference should the user decide to reference the purchase transaction, for example, to return a product, exchange a product, receive a price match discount, receive another type of discount, receive a later-discover promotion, etc.

At block 306, token manager module 150A of payment system 130A creates an association between the payment token and the purchase. In an example, token manager module 150A creates an association between a payment token and a tokenized payment transaction, by linking the payment token and transaction details via one or more common identifiers. For example, token manager module 150A may associate a payment token and a transaction using a unique transaction ID generated by mobile payment system 130, a unique transaction ID generated by a merchant 190 or terminal, or any other identifier or combination of identifiers that may be used to link a payment token with a transaction. In some examples, token manager module 150A also may associate a payment token the transaction by storing a copy of the payment token with or as part of corresponding transaction receipt data.

At block 308, token manager module 150A of payment system 130A stores the association between the payment token and the purchase. In an example, token manager module 150A stores a payment token, corresponding transaction details, and at least one identifier associating the payment token with the corresponding transaction on a client machine 102A and/or a separate data store 180. For example, token manager module 150A may store such information locally on a client machine 102A to allow a user to later retrieve the digital receipt for the transaction and to provide a corresponding payment token to a merchant 190. Token manager module 150A similarly may save such information in data store 180 (e.g., network storage, cloud storage, etc.) to allow later retrieval of the digital receipt for the transaction and a corresponding payment token using any of one or more client machines 102A-102N.

At block 310, communication manager module 140A of mobile payment system 130A receives a request from the merchant 190 to provide the payment token during a second transaction related to the purchase. In an example, the user may visit the same location or a different location of the merchant 190 to perform a new transaction related to a purchase involving a payment token. For example, a user may wish to return an item, to exchange an item, to receive a price match, to receive a later discovered discount, etc. in reference to the original purchase. In one example, a NFC terminal 192 of merchant 190 prompts or directs a user to provide a payment token from the earlier purchase at a NFC terminal 192.

At block 312, wallet manager module 160A of mobile payment system 130A selects a transaction record corresponding to the tokenized payment transaction to retrieve the payment token for the merchant 190. In an example, wallet manager module 160A provides a user with a graphical user interface to browse, search, sort, filter, retrieve, and select one or more digital wallet receipts. The user then may select a digital wallet receipt associated with an earlier transaction to retrieve transaction details and an associated payment token to provide to a merchant 190.

At block 314, wallet manager module 160A of mobile payment system 130A provides the payment token to the merchant 190 as part of the second transaction. In an example, a user may tap or wave their computing device at a NFC terminal 192 waiting to accept a payment token associated with an earlier transaction at block 312. A merchant 190 then may find and retrieve details about the earlier transaction using the payment token provided by the user to complete a new transaction based on the earlier transaction.

Figure 4:
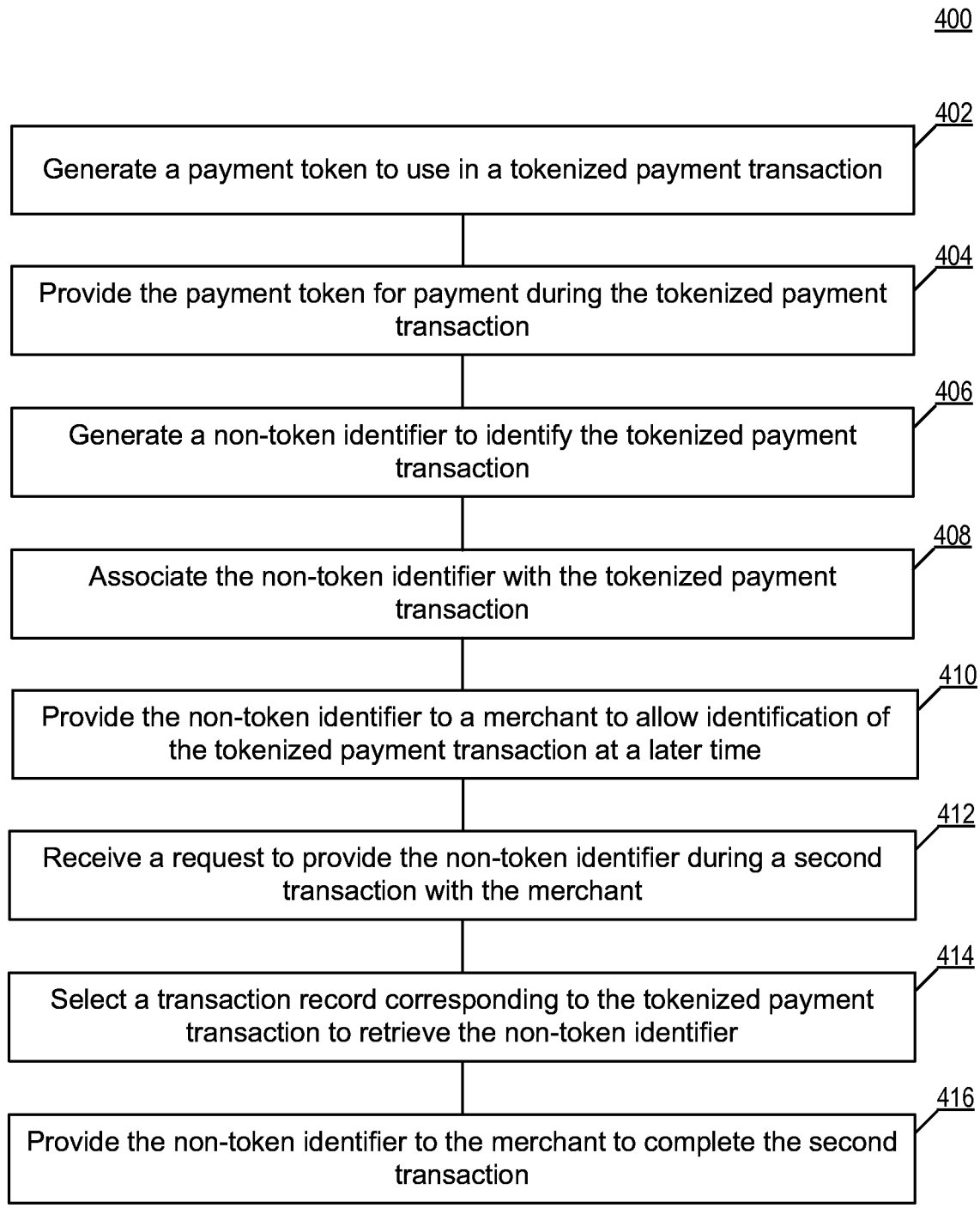
FIG. 4 is a flow diagram for providing replay of tokenized payment transactions using a non-payment identifier, according to an example of the present disclosure.

FIG. 4 is a flow diagram for providing replay of tokenized payment transactions using a non-payment identifier, according to an example of the present disclosure. The method 400 may be performed by processing logic that may comprise hardware (circuitry, dedicated logic, programmable logic, microcode, etc.), software (such as instructions run on a general purpose computer system, dedicated machine, or processing device), firmware, or a combination thereof. Examples in the method 400 are described with respect to mobile payment system 130A for the sake of consistency. Such examples also generally apply to other mobile payment system 130, 130N examples described herein.

Method 400 begins at block 402 when token manager module 150A of mobile payment system 130A generates a payment token to use in a tokenized payment transaction. In an example, token manager module 150A generates a payment token authorizing a payment for a tokenized payment transaction involving a NFC terminal 192 or tokenized payment system 194. For example, token manager module 150A may generate unique, single-use payment token for each tokenized or contactless payment transaction of a user and/or a plurality of users to provide an enhanced level of transactional and payment method security.

At block 404, wallet manager module 160A of mobile payment system 130A provides the payment token for payment during the tokenized payment transaction. In an example, a user provides a payment token to NFC terminal 192 by moving a NFC-enabled client machine 102A in range of NFC terminal 192. A user also may sending a payment token to a tokenized payment system 194, for example, by initiating such activity using an application running on client machine 102A.

At block 406, wallet manager module 160A of mobile payment system 130A generates a non-payment identifier to identify the tokenized payment transaction. In an example, wallet manager module 160A generates a unique non-payment identifier for a tokenized payment transaction involving a payment token. A non-payment identifier may be a unique identifier that allows a tokenized payment transaction to be located without using the original payment token involved in the transaction. A non-payment identifier may include a unique numeric string, alphanumeric string, bar code, QR code, or any other unique identifier that can be used to reference a tokenized payment transaction. In some examples, a merchant 190 may generate a non-payment identifier to uniquely identify a tokenized payment transaction and provide the non-payment identifier to a user where it may be stored on client machine or in another data store 180 for future reference.

At block 408, wallet manager module 160A of mobile payment system 130A associates the non-payment identifier with the tokenized payment transaction. In an example, wallet manager module 160A associates the non-payment identifier generated for a tokenized payment transaction to allow the tokenized payment transaction to be referenced by the non-payment identifier at another time. For example, wallet manager module 160A may add a non-payment identifier to transaction details of a completed tokenized payment transaction.

At block 410, wallet manager module 160A of mobile payment system 130A provides the non-payment identifier to a merchant to allow identification of the tokenized payment transaction at another time. In an example, wallet manager module 160 provides the non-payment identifier associated with the tokenized payment transaction to a merchant 190. The merchant 190 then may store the non-payment identifier received from the user to reference the tokenized payment transaction at another time (e.g., based on a user inquiry or related transaction). In some examples, a merchant 190 stores a non-payment identifier it has generated and provided to a user. The user receives and stores the non-payment identifier generated by the merchant 190 to reference the tokenized payment transaction at another time without providing the payment token used in the transaction.

At block 412, communication manager module 140A of mobile payment system 130A receives a request to provide the non-payment identifier during a second transaction with the merchant. In an example, a user may wish to reference, alter, modify, append, or cancel a previously completed tokenized payment transaction at another time. When involved in such a transaction, a user may receive a request from a merchant 190 to provide a non-payment identifier uniquely identifying a previous transaction. For example, a NFC terminal 192 may prompt a user to submit a non-payment identifier using a NFC-enabled computing device or a tokenized payment system 194 may request that a user submit a non-payment identifier via a mobile application. Further, a standard terminal 196 may request a user to provide a non-payment identifier by inputting or scanning non-payment identifier data.

At block 414, wallet manager module 160A of mobile payment system 130A selects the transaction record corresponding to the tokenized payment transaction to retrieve the non-payment identifier. In an example, a user locates and selects a transaction receipt having an associated non-payment identifier from a list of one or more transaction receipts provided by wallet manager module 160A to retrieve the associated non-payment identifier.

In an example, a user places client machine 102A in range of a NFC terminal 192 to receive a merchant 190 or other identifier (e.g., merchant ID, customer loyalty ID, etc.) that can be used to identify one or more transactions. In response, wallet manager module 160A receives the merchant-provided transaction identifier and finds and provides one or more matching transactions to a user. The user then may select one of the matching transactions to retrieve the associated non-payment identifier of the selected transaction.

At block 416, wallet manager module 160A of mobile payment system 130A provides the non-payment identifier to the merchant to complete the second transaction. In an example, after a user selects a transaction having an associated non-payment identifier at block 414, the user then places client machine 102A near a NFC terminal 192 ready to accept and use the non-payment identifier to retrieve details of the associated transaction. In one example, a user may submit the retrieved non-payment identifier to a tokenized payment system 194 using a computer application running on client machine. Further, a user may enter or scan non-payment identifier information provided by client machine at a standard terminal 196. Once a merchant 190 receives a non-payment identifier for a tokenized payment transaction, returns, exchanges, and other related transactions can be completed using existing merchant 190 processes and systems.

Figure 5:
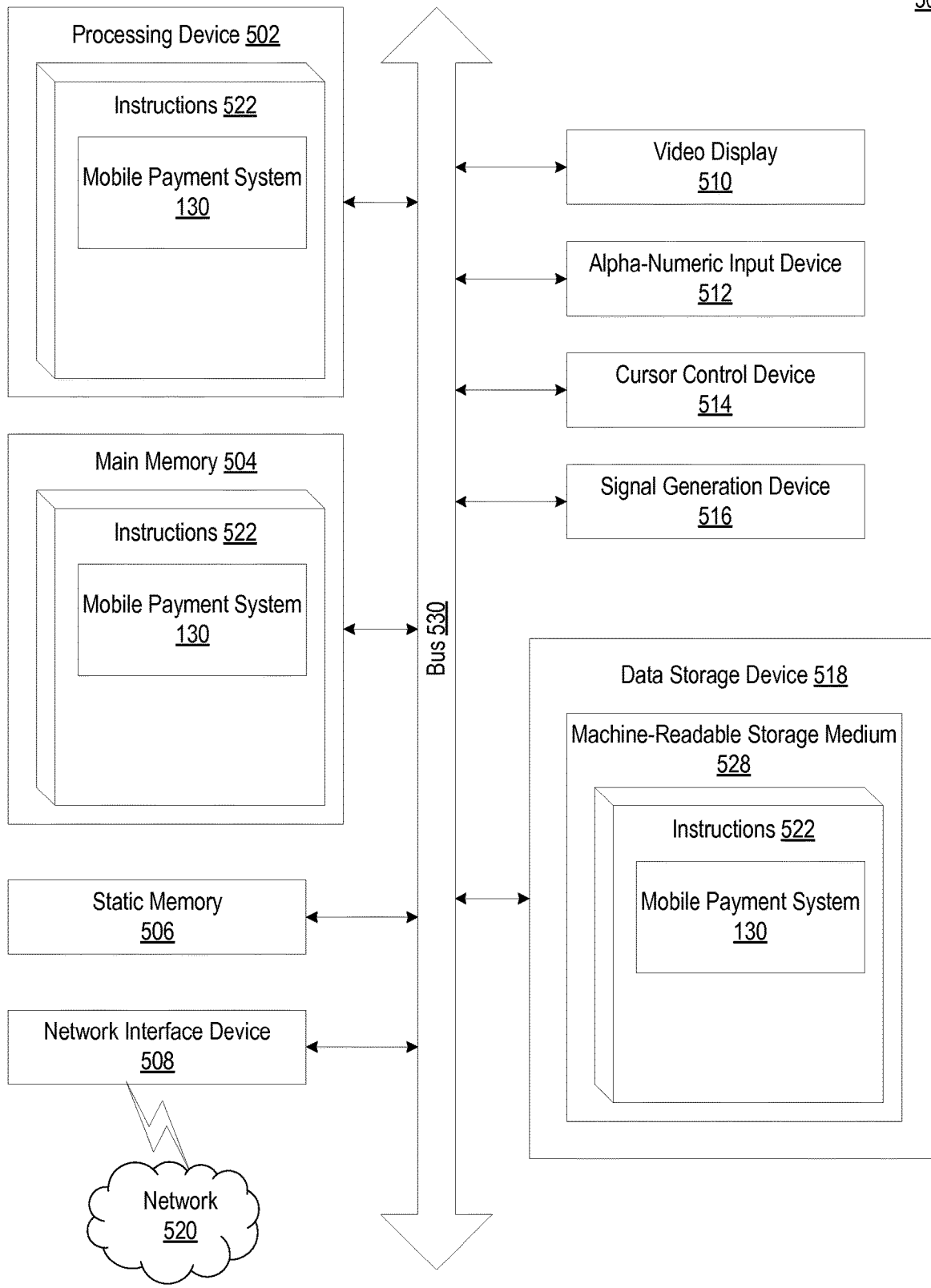
FIG. 5 is a block diagram of an exemplary computer system that may perform one or more of the operations described herein.

FIG. 5 illustrates a diagram of a machine in the exemplary form of a computer system 500, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 also may be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 also may include a network interface device 508. The computer system 500 may further include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software computer instructions) embodying any one or more of the methodologies or functions described herein. The instructions 522 also may reside, completely or at least partially, within the main memory 504 and/or within the processor 502 during execution thereof by the computer system 500, the main memory 504 and the processor 502 also constituting computer-readable storage media. The instructions 522 may be transmitted or received over a network 520 via the network interface device 508.

In one example, the instructions 522 include instructions for one or more modules of a mobile payment system (e.g., mobile payment system 130 of FIG. 1) and/or a software library containing methods that call a mobile payment system. While the computer-readable storage medium 528 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "associating", "applying", "transmitting", "receiving," "processing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A client device communicating with a tokenized payment system used to conduct contactless payment transactions, comprising:
   a non-transitory memory;
   a hardware processing device coupled to the non-transitory memory;
   a token manager, executed by the hardware processing device of the client device, and configured to:
   generate a token, wherein the token is a single-use payment token provided as a form of payment in a tokenized payment transaction with the tokenized payment system; and
   a wallet manager, executed by the hardware processing device of the client device and configured to:
   generate a unique non-payment identifier for the tokenized payment transaction involving the token;
   associate the unique non-payment identifier with the token and the tokenized payment transaction, wherein the unique non-payment identifier that associates the token and the tokenized payment transaction allows subsequent retrieval of transaction data of the tokenized payment transaction;
   provide the unique non-payment identifier to a merchant at completion of the tokenized payment transaction, wherein the unique non-payment identifier identifies the tokenized payment transaction during a second transaction with the tokenized payment system, and wherein the second transaction modifies the tokenized payment transaction;
   upon initiation of the second transaction, receive a request from the merchant to provide the unique non-payment identifier associated with the tokenized payment transaction;
   identify the unique non-payment identifier using a digital receipt associated with the tokenized payment transaction; and
   provide the unique non-payment identifier to a near field communication (NFC) device of the merchant to complete the second transaction that modifies the tokenized payment transaction.

2. The client device of claim 1, further comprising:
   a communication manager, executed by the hardware processing device, and configured to receive the token for the tokenized payment transaction.

3. The client device of claim 1, wherein the wallet manager further:
   provides the token to the merchant as part of the tokenized payment transaction.

4. The client device of claim 1, wherein the wallet manager further:
   provides the unique non-payment identifier to the merchant as part of the second transaction associated with the tokenized payment transaction.

5. The client device of claim 1, wherein the unique non-payment identifier provided to the merchant during the second transaction is previously provided in the tokenized payment transaction.

6. The client device of claim 1, wherein the second transaction is a second tokenized transaction involving a return of at least one item from the tokenized payment transaction.

7. A computer-implemented method for a user device communicating with a tokenized payment system used to conduct contactless payment transactions, comprising:
   creating, by the user device, a unique non-payment identifier linking a token and a first tokenized payment transaction conducted with a merchant over the tokenized payment system, wherein the token is a single-use payment token provided as a form of payment in the first tokenized payment transaction;

storing, on the user device, the unique non-payment identifier linking the token and the first tokenized payment transaction in a digital receipt, wherein the unique non-payment identifier linking the token and the tokenized payment transaction allows for subsequent retrieval of transaction data of the first tokenized payment transaction;

providing, by the user device, the unique non-payment identifier to the merchant as part of the first tokenized payment transaction, wherein the unique non-payment identifier identifies the tokenized payment transaction during a second transaction with the tokenized payment system, and wherein a second payment transaction modifies the first tokenized payment transaction;

upon initiation of the second payment transaction, receive a request from the merchant to provide the unique non-payment identifier associated with the tokenized payment transaction;

identifying at the user device the unique non-payment identifier using the digital receipt associated with the tokenized payment transaction; and providing, by the user device, the unique non-payment identifier to the merchant via a near field communication (NFC) terminal as part of a second transaction that modifies the first tokenized payment transaction, whereby the unique non-payment identifier enables a computing device associated with the merchant to identify the first tokenized payment transaction.

8. The computer-implemented method of claim 7, further comprising:

generating unique non-payment identifiers for different tokenized payment transactions.

9. The computer-implemented method of claim 7, further comprising:

providing the token to the merchant as part of the first tokenized payment transaction.

10. The computer-implemented method of claim 7, further comprising:

providing the unique non-payment identifier to the merchant as part of the second transaction associated with the tokenized payment transaction.

11. The computer-implemented method of claim 7, wherein the unique non-payment identifier provided to the merchant during the second transaction is previously provided in the first tokenized payment transaction.

12. The computer-implemented method of claim 7, wherein the second transaction involves a return of at least one item from the tokenized payment transaction.

13. A client device communicating with a tokenized payment system used to conduct contactless payment transactions, comprising:

a non-transitory memory;

a hardware processing device coupled to the non-transitory memory;

a token manager, executed by the hardware processing device of the client device, and configured to:

generate a token, wherein the token is a single-use payment token provided as a form of payment in a tokenized payment transaction with the tokenized payment system; and a wallet manager, executed by the hardware processing device of the client device and configured to:

generate a unique non-payment identifier for the tokenized payment transaction involving the token;

associate the unique non-payment identifier with the token and the tokenized payment transaction, wherein the unique non-payment identifier is a QR code and the association between the token and the tokenized payment transaction allows for subsequent retrieval of transaction data of the tokenized payment transaction;

provide the unique non-payment identifier to a merchant at completion of the tokenized payment transaction, wherein the unique non-payment identifier identifies the tokenized payment transaction during a second transaction with the tokenized payment system, and wherein a second transaction modifies the tokenized payment transaction;

upon initiation of the second transaction, receive a request from the merchant to provide the unique non-payment identifier associated with the tokenized payment transaction;

identify the unique non-payment identifier using a digital receipt associated with the tokenized payment transaction; and provide the unique non-payment identifier to a point-of-sale terminal of the merchant to complete the second transaction that modifies the tokenized payment transaction.

14. The client device of claim 13, further comprising:

a communication manager, executed by the hardware processing device, and configured to receive the token for the tokenized payment transaction.

15. The client device of claim 13, wherein the wallet manager further:

provides the token to the merchant as part of the tokenized payment transaction.

16. The client device of claim 13, wherein the wallet manager further:

provides the unique non-payment identifier to the merchant as part of the second transaction associated with the tokenized payment transaction.

17. The client device of claim 13, wherein the unique non-payment identifier provided to the merchant during the second transaction is previously provided in the tokenized payment transaction.

18. The client device of claim 13, wherein the second transaction is a second tokenized transaction involving a return of at least one item from the tokenized payment transaction.

19. The client device of claim 13, wherein the token manager is further configured to:

generate unique non-payment identifiers for different tokenized payment transactions.

20. The client device of claim 1, wherein the token manager is further configured to:

generate unique non-payment identifiers for different tokenized payment transactions.

* * * * *